United States Patent
Holmertz et al.

(10) Patent No.: US 10,058,069 B2
(45) Date of Patent: Aug. 28, 2018

(54) GRIPPING DEVICE FOR A ROBOTIC MANIPULATION DEVICE ADAPTED TO GRIP AND ATTACH TEAT CUPS TO AN ANIMAL

(71) Applicant: DELAVAL HOLDING AB, Tumba (SE)

(72) Inventors: Nils-Erik Holmertz, Tumba (SE); Helmut Obermuller, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 319 days.

(21) Appl. No.: 14/899,134

(22) PCT Filed: Jun. 17, 2014

(86) PCT No.: PCT/SE2014/050744
§ 371 (c)(1),
(2) Date: Dec. 17, 2015

(87) PCT Pub. No.: WO2014/204395
PCT Pub. Date: Dec. 24, 2014

(65) Prior Publication Data
US 2016/0128298 A1   May 12, 2016

(30) Foreign Application Priority Data
Jun. 20, 2013   (SE) ...................................... 1350758

(51) Int. Cl.
*A01J 3/00* (2006.01)
*A01J 5/017* (2006.01)

(52) U.S. Cl.
CPC ............ *A01J 5/0175* (2013.01); *Y10S 901/02* (2013.01); *Y10S 901/29* (2013.01); *Y10S 901/36* (2013.01)

(58) Field of Classification Search
CPC ................................. A01J 5/017; A01J 5/0175
See application file for complete search history.

(56) References Cited

U.S. PATENT DOCUMENTS

| 4,441,455 A | 4/1984 | Lowry et al. |
| 5,950,561 A * | 9/1999 | Redmond ............... A01J 5/017 119/14.23 |

(Continued)

FOREIGN PATENT DOCUMENTS

| DE | 196 39 860 A1 | 4/1998 | |
| DE | 102006012154 A1 * | 9/2007 | ............ A01J 5/0175 |

(Continued)

OTHER PUBLICATIONS

International-Type Search Report, dated Dec. 19, 2013, from corresponding PCT application.

(Continued)

*Primary Examiner* — Kristen C Hayes
(74) *Attorney, Agent, or Firm* — Young & Thompson

(57) ABSTRACT

A gripping device for a robotic manipulation device that grips and attaches teat cups to an animal. The gripping device for each teat cup to be gripped and attached includes a holding member configured to releasably hold a teat cup, and a power member configured to move the holding member from a base position (p1) to a raised position (p2) in which the teat cup can be attached to a teat. The gripping device for each teat cup to be gripped and attached includes a movable cover portion movably arranged between a covering position, in which it covers the opening of the teat cup, and a non-covering position, in which the opening of the teat cup is exposed. When power member lifts the holding member from the base position to the raised position, the movable cover portion moves from the covering position to the non-covering position.

20 Claims, 6 Drawing Sheets

(56) References Cited

U.S. PATENT DOCUMENTS

| | | | | |
|---|---|---|---|---|
| 8,670,867 B2* | 3/2014 | Seaton | ............... | A01K 1/126 |
| | | | | 119/14.45 |
| 9,426,966 B2* | 8/2016 | Krone | ............... | A01J 5/0175 |
| 2008/0178811 A1* | 7/2008 | Heinrich | ............ | A01J 5/0175 |
| | | | | 119/14.04 |
| 2011/0087372 A1* | 4/2011 | Seaton | ............... | A01K 1/126 |
| | | | | 700/245 |
| 2014/0041591 A1* | 2/2014 | Krone | ............... | A01J 5/0175 |
| | | | | 119/14.02 |

FOREIGN PATENT DOCUMENTS

| | | | | |
|---|---|---|---|---|
| DE | 10 2006 051 362 A1 | 4/2008 | | |
| DE | 10 2011 001 404 A1 | 9/2012 | | |
| EP | 0476771 A1 * | 3/1992 | ............ | A01J 5/0175 |
| EP | 0 811 319 A1 | 12/1997 | | |
| GB | 610301 A | 10/1948 | | |
| RU | 2 293 465 C2 | 2/2007 | | |
| SU | 1306523 A2 | 4/1987 | | |
| SU | 1349735 A1 | 11/1987 | | |

OTHER PUBLICATIONS

International Search Report, dated Oct. 9, 2014, from corresponding PCT application.
Supplementary International Search Report, dated Oct. 9, 2015, from corresponding PCT application.

* cited by examiner

GRIPPING DEVICE FOR A ROBOTIC MANIPULATION DEVICE ADAPTED TO GRIP AND ATTACH TEAT CUPS TO AN ANIMAL

BACKGROUND OF THE INVENTION AND PRIOR ART

The present invention relates to a gripping device for a robotic manipulation device adapted to grip and attach teat cups to an animal, wherein the gripping device for each teat cup to be gripped and attached comprises a holding member configured to releasably hold a teat cup, and a power member configured to lift the holding member from a base position to a raised position in which the teat cup can be attached to a teat of an animal.

In a conventional parallel rotary parlour, the cows walk onto an annular rotating platform and enter a milking stall. The platform may rotate intermittently, or continuously with a constant low speed. The continuous flow of cows gives rotary parlours a high milking capacity. When such rotary milking parlours are automated, the teat cups are attached to the cows by means of a robotic manipulation device, which may e.g. be arranged on the outside of the rotary platform. Such a robotic manipulation device may comprise a gripping device which grips teat cups in a teat cup storage position on the rotary platform. The robotic manipulation device then moves the gripping device with the gripped teat cups to an area below the udder of a cow, via the space between the rear legs of the cow, whereupon each teat cup is attached to a respective teat of the cow.

US 2011/0087372 shows a robotic manipulation device comprising a gripping device for attaching the teat cups of a cluster to a cow. The gripping device comprises four gripping members, each gripping a teat cup of the cluster when it hangs in a parking position with the teat cups hanging with their openings directed downwards. When the teat cups have been gripped, the robotic manipulation device rotates the teat cups 180° such that the openings of the teat cups are directed upwards. The robotic manipulation device moves the teat cups and the claw between the rear legs of the cow to a position below the udder of the cow. The teat cups are then lifted one at a time by means of a respective actuator and shaft to a raised position in which the teat cup can be attached to a teat. However, there is always a risk that manure falls into the inner space of the teat cups when they are moved in an upwardly directed position through the space between the rear legs of a cow. Furthermore, there is also a risk that manure penetrates into the inner space of the teat cups when they are waiting in position below the udder of a cow to be attached to a teat.

SUMMARY OF THE INVENTION

The object of the present invention is to provide a gripping device for a robotic manipulation device having a design making it possible to hold and lift one teat cup at a time to a raised position without the risk that the inner space of the teat cups will be contaminated by manure.

This object is obtained, according to the invention, by the feature that the gripping device, for each teat cup to be gripped and attached, further comprises a movable cover portion movably arranged between a covering position, in which it covers the opening of the teat cup, and a non-covering position, in which the opening of the teat cup is exposed, wherein the action of the power member lifting the holding member from the base position to the raised position causes a movement of the movable cover portion from the covering position to the non-covering position. Preferably, the holding member is in the base position the whole time from the time when it grips a teat cup in a parking position until the gripping device has been positioned to attach the teat cup to a teat of an animal. In this way, the opening of the teat cup will be covered by the movable cover portion during the whole time the teat cup is carried by the gripping device, except for a very short time just before the teat cup is attached to a teat. Since the opening of the teat cup is covered while the teat cup is carried by the gripping device, it is possible to move the teat cup while it is in an upwardly directed position along any path below the rear part of an animal without the risk that manure or other pollutions penetrate into the inner space of the teat cup. Since the cover portions are comprised in the gripper device, they will not be in the way of cleaning and draining of the teat cups after milking.

According to an embodiment of the invention, the movable cover portion reaches the non-covering position before or at the same time as the holding member reaches the raised position. Preferably, the movement of the movable cover portion towards the non-covering position starts at the same time as, or later than, the holding member starts the movement from the base position towards the raised position. The movable cover portion then reaches the non-covering position before or at the same time as the holding member reaches the raised position. In this case, no part of the movable cover portion will come in contact with the animal and disturb the attachment process of the teat cup.

According to an embodiment of the invention, the movement of the power member, when it moves the holding member from the base position to the raised position, is mechanically transmitted to a movement of the movable cover portion from the covering position to the non-covering position. In this case, the already existing power member provides the movement of the movable cover portion from the covering position to the non-covering position. Thereby, the movable cover portion is automatically moved from the covering position to the non-covering position at the same time as the power member lifts the holding member from the base position to the raised position.

According to an embodiment of the invention, said movement is mechanically transmitted by the teat cup itself. The cover portion is in contact with or positioned close to an upper portion of the teat cup when it covers the opening of the teat cup. When the holding member is raised from the base position to the raised position, the upper portion of the teat cup is also raised. The movement of the upper portion of the teat cup is here mechanically transmitted to a movement of the movable cover portion from the covering position to the non-covering position.

According to an embodiment of the invention, the gripping device further comprises a power element configured to move the movable cover portion from the covering position to the non-covering position, and a control unit configured to initiate activation of the power element such that it moves the movable cover portion to the non-covering position in response to the action of the power member lifting the holding member from the base position. In this case, a control unit controls the uncovering process of the teat cup. The control unit may initiate activation of the power element by means of a control valve supplying a vacuum pressure, a pneumatic pressure or a hydraulic pressure to the power element. The control unit may initiate activation of the power element and the movement of the movable cover portion to the non-covering position just before or during the period of time when the holding member is lifted from the base position to the raised position.

According to an embodiment of the invention, the movable cover portion is plate-shaped. A plate-shaped movable cover portion may have its main extension in a plane forming a right angle in relation to a longitudinal axis of the teat cup. Such a movable cover portion may be made relatively thin and only requiring a small space.

According to an embodiment of the invention, the movable cover portion is a part of a cover element which also comprises a stationary cover portion. In this case, only parts of the cover element which cover an opening to a teat cup are formed as movable cover portions. The stationary cover portion may form a protective roof above sensitive components of the gripping device such as the holding members and the power members when the teat cup is held in an upwardly directed position. The stationary cover portion may also be used for attachment of the cover element to the gripping device.

According to an embodiment of the invention, the movable cover portion is made of a resilient material. The movable cover portion may be made of a material which is resistant to manure and has good resilient properties, such as a suitable rubber material. Such a movable cover portion may close the opening of a teat cup with a resilient force, it may be moved from the covering position to the non-covering position against the action of a resilient force, and it may be moved back to the covering position by the resilient force. The cover element may e.g. be made of a resilient material in one piece and the movable cover portion be a part of the one piece cover element. Such a cover element can have a design such that it covers the opening to the teat cup and protects all sensitive components of the gripping device. A movable cover portion may be defined by at least one cutout in the one piece cover element. Such a movable cover portion may have a rectangular shape defined by two parallel cutouts arranged between an outer side and an inner side of the movable cover portion. The inner side of the movable cover portion may form a resilient connection with the stationary cover portion of the cover element. Alternatively, the cover element may comprise a protruding portion which forms said movable cover portion.

According to an embodiment of the invention, the movable cover portion is connected to the stationary cover portion by means of a pivot joint. In this case, the movable cover portion performs a pivot movement when it is moved from the covering position to the non-covering position. The movable cover portion and the stationary cover portion of the cover element may be made of a stiff material such as a suitable metal material or a stiff plastic material. The pivot joint may include a spring member configured to move the movable cover portion towards the covering position. Thereby, the movable cover portion abuts the upper portion of the teat cup which comprises the opening with a spring force. In this case, the movable cover portion may be moved from the covering position to the non-covering position by being pushed by a component such as the upper portion of the teat cup against the action of the spring member. The spring member moves the movable cover portion back to the covering position when the gripper member has released the teat cup and the teat cup has been attached to a teat.

According to an embodiment of the invention, the movable cover portion is slidably arranged between the covering position and the non-covering position. Such a sliding motion may be performed by a power element. In this case, a control unit may activate the power element when it is time to slide the movable part from the covering position to the non-covering position. The actuator may also be used to move the movable cover portion back to the covering position. Alternatively, a spring member may be used to return the movable cover portion back to the covering position.

According to an embodiment of the invention, the gripping device comprises a raised portion configured to support the cover element such that at least the movable cover portion is arranged at the same level as the level of the upper end portion of a gripped teat cup. At least the movable cover portion of the cover element is to be arranged at the same level as the upper end portion of the teat cup in order to cover the opening of the teat cup. Preferably, the whole cover element is arranged at the same level as the upper end portion of the gripped teat cup. The teat cup is gripped in an area located at a distance from the upper end portion of the teat cup. Thereby, the upper end portion of the teat cup will be located at a higher level than the holding member when the teat cup is held in an upwardly directed position. A suitably formed raised portion may be used to attach the cover element at a distance above the holding member such that the holding member does not come in contact with the cover element when it is moved from the base position to the raised position. Such a cover element forms a protective roof above the holding member and the power member when the teat cup is held in the upwardly directed position.

According to an embodiment of the invention, the gripping device comprises several gripping members each configured to grip a respective teat cup in a parking position. Preferably, the gripping device has a design such that it is possible to grip all four teat cups in a parking position. The gripping device may comprise four holding members each gripping a teat cup in a parking position. The teat cups may be connected to a claw of a cluster. The cover element comprises a movable cover portion for each teat cup. The cover element may comprise one or several stationary portions supporting the movably arranged cover portions.

The invention also relates to a robotic manipulation device comprising a gripping device according to any one of the claims 1 to 14. There is often not enough space below an udder of an animal to perform a turning movement of a plurality of carried teat cups and especially not if the teat cups are connected to a claw. For this reason, the robotic manipulation device has to move the teat cups in an upwardly directed position to an area below the udder of an animal. There is here a risk that manure will penetrate into the inner space of the teat cups. However, the use of a gripping device which comprises movable cover portions according to the above makes it possible to move the teat cups in an upwardly directed position to the area below the rear portions of an animal without the risk that manure penetrates into the inner space of the teat cups.

The robotic manipulation device may be configured to grip at least one teat cup in a parking position in a first area, move the at least one teat cup to a second area located behind an animal, cover the openings of the at least one teat cup with the movable cover portions of the gripping device, and move the at least one teat cup, in a position in which the openings of the teat cups are directed upwardly, from the second area to a third area located below the teats of the animal via a space between the rear legs of the animal, whereupon the teat cups are attached to the teats of the animal. Consequently, the robotic manipulation device comprises a gripping device which comprises at least one movable cover portion according to the above which covers the opening of a carried teat cup. The use of the movable cover portion makes it possible to move the teat cups in an upwardly directed position along the above mentioned path below the rear parts of the animal without the risk that manure will penetrate into the inner space of the teat cups. Since the cover portions are comprised in the gripper device, they will not be in the way of cleaning and draining of the teat cups after milking.

BRIEF DESCRIPTION OF THE DRAWINGS

In the following, preferred embodiments of the invention are described by examples and with references to the attached drawings, in which.

BRIEF DESCRIPTION OF PREFERRED EMBODIMENTS OF THE INVENTION

Figure 1:
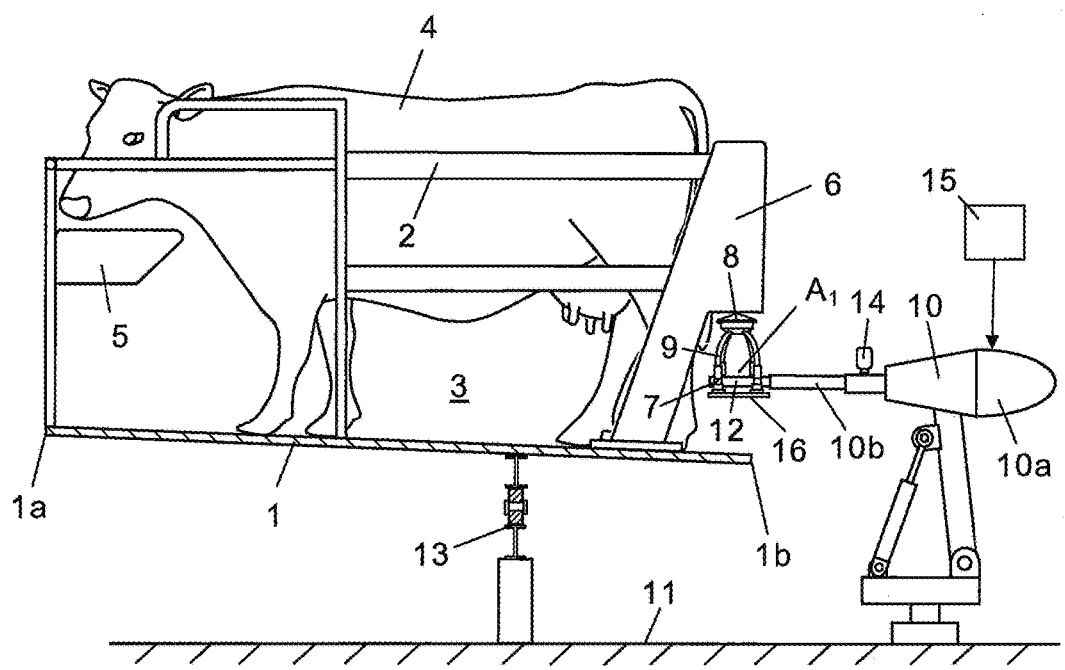
FIG. 1 shows a robotic manipulation device with a gripping device according to the invention when it grips teat cups of a cluster in a storing device.

FIG. 1 shows a part of an annular rotary platform 1 having a radial extension between an inner edge portion 1a and an outer edge portion 1b. The platform 1 may be provided with a plurality of fence elements 2 each having a substantially radial extension on the platform 1. The fence elements 2 divide the annular platform into a plurality of milking stalls 3. However, only one of the fence elements 2 and one of the milking stalls 3 are visible in FIG. 1. A cow 4 is standing in the milking stall 3. The cow 4 is here standing in a substantially radial direction on the annular platform 1 with the head in the vicinity of the inner edge portion 1a of the platform 1. The milking stall 3 may comprise a feeding trough 5, and a storing device 6 adapted to store a cluster in a parking position. The cluster comprises, in a conventional manner, four teat cups 7 which are connected to a claw 8 via a respective short milk tube 9 and a short pulse tube. In this case, the storing device 6 has a cabinet-like structure and constitutes a part of the fence element 2. The storing device 6 is mounted on a floor surface of the platform 1. The storing device 6 holds the cluster in a parking position at a distance above the floor surface of the platform 1 on one side of the cow 4 in the vicinity of the outer edge portion 1b of the platform 1. The teat cups 7 hang downwardly from the claw 8 in the parking position of the cluster. Consequently, the openings of the teat cups 7 are directed downwardly. The storing device 6 contains a non-shown removing device retracting the cluster to the parking position when a milking process of a cow 4 has been finished.

A robotic manipulation device 10 has the task of attaching teat cups 7 to the cow 4 in the milking stall 3. In this case, the robotic manipulation device 10 is mounted on a floor surface 11 at the side of the rotary platform 1. The robotic manipulation device 10 comprises a body 10a and a telescopic robotic arm 10b. The telescopic robotic arm 10b is, at an outer end, provided with a gripping device 12. A rolling arrangement 13 allows a rotary motion of the platform 1 in relation to the floor surface 11. A camera 14 is mounted on the robotic arm 10b. A control unit 15 controls the robotic manipulation device 10.

During operation of the rotary parlour, a cow 4 to be milked enters the milking stall 3. The feeding trough 5 attracts the cow 4 and facilitates the positioning of the cow 4 in the milking stall 3. When the milking stall 3 has rotated to a predetermined position, it is time to attach the teat cups 7 to the cow 4. The control unit 15 activates the robotic manipulation device 10 such that it moves the gripping device 12 from a resting position at the side of the platform 1 towards the cluster in the storing device 6. Each teat cup 7 hangs downwardly in a parking position which is defined by the storing device 6. The control unit 15 controls the robotic manipulation device 10 such that it moves the gripping device 12 to a central position of a first area $A_1$ in which two teat cups 7 end up on one side of the gripping device 12 and two teat cups 7 end up on the opposite side of the gripping device 12. The gripping device comprises a plate-shaped cover element 16.

Figure 2:
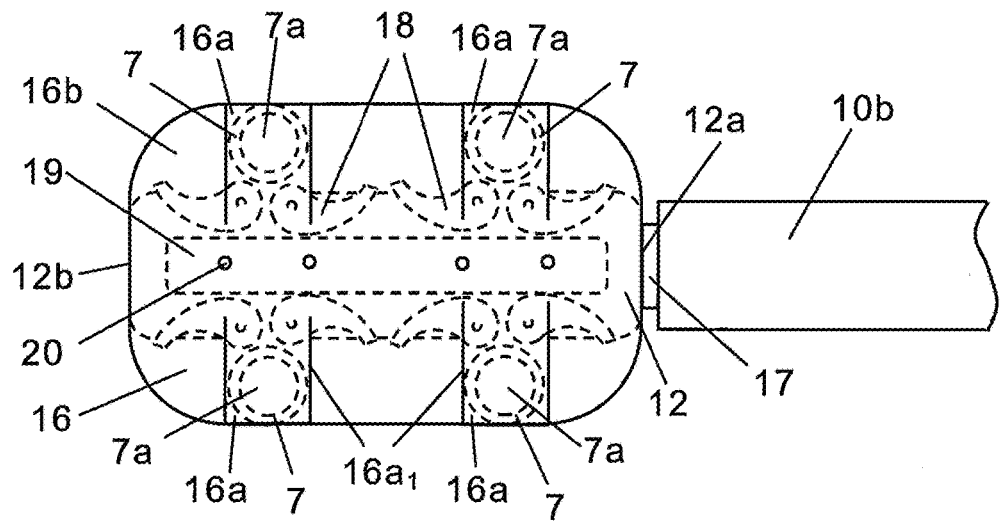
FIG. 2 shows a view from the below of the gripping device before it has gripped the teat cups in the storing device.

FIG. 2 shows a view from below of the gripping device 12 before it has gripped the teat cups 7 in the first area $A_1$. The components which are hidden by the cover element 16 are shown with dashed lines. The gripping device 12 has an extension between an inner end 12a rotatably connected to the telescopic robotic arm 10b via a pivot shaft 17 and an outer free end 12b. The gripping device 12 comprises four gripping members 18. Each gripping member 18 comprises two pivotally arranged gripping units which each is pivotally arranged between an open position and a closed position. Two gripping members 18 are mounted close to the outer end 2b on opposite sides of the gripping device 12, and two gripping members 18 are mounted close to the inner end 2a of the gripping device 12, on opposite sides of the gripping device 12. The four gripping members 18 are mounted in corresponding positions as the four teat cups 7 when they are in their respective parking position.

The control unit 15 controls the robotic manipulation device 10 such that it moves the gripping device 12 to a central position in the first area $A_1$, in which each gripping member 18 will be positioned very close to a respective teat cup 7. In this case, the cover element 16 is made by a rubber material in one piece. The cover element 16 has a design such that it covers the gripping device 12 and the teat cups 7. The teat cups 7 are covered by a respective movable cover portion 16a of the cover element 16. Each movable cover portion 16a is rectangular with a free outer side, two cutout long sides $16a_1$, and an inner side connected to a stationary cover portion 16b of the cover element 16. The gripping device 12 comprises a raised portion 19 centrally located between the gripping members 18 arranged on the opposite sides of the gripping device 12. The stationary cover portion 16b of the cover element 16 is fixedly attached to the raised portion 19 by means of suitable fastening members 20 which may be rivets, bolts, screws etc. The raised portion 19 supports the cover element 16 at a level corresponding to the openings 7a of the teat cups 7 to be gripped.

Figure 3:
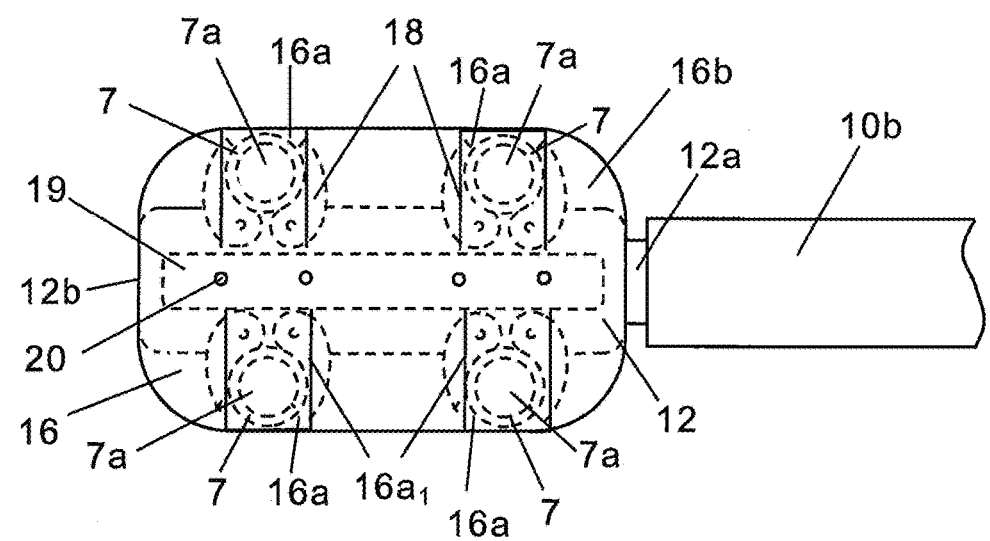
FIG. 3 shows a view from below of the gripping device when it has gripped the teat cups in the storing device.
Figure 4:
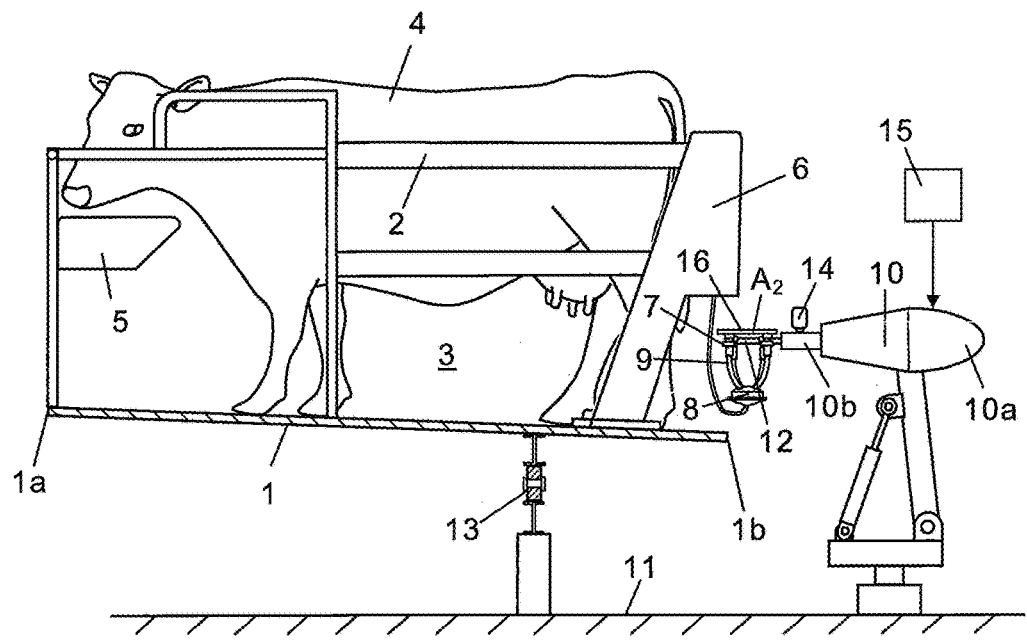
FIG. 4 shows the robotic manipulation device when it has rotated the gripped teat cups to an upwardly directed position.
Figure 5:
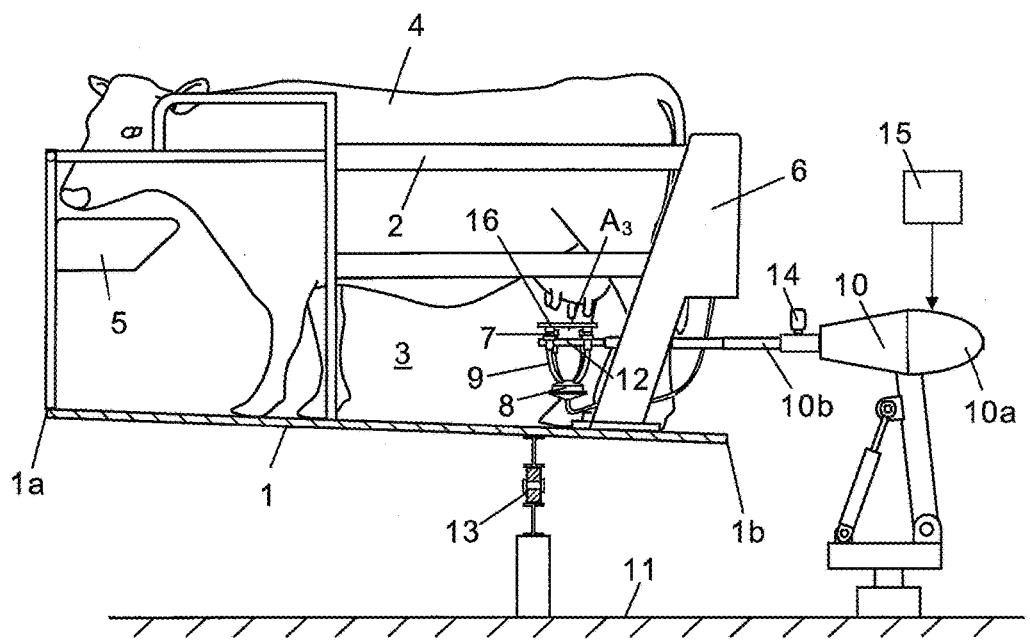
FIG. 5 shows the robotic manipulation device when it has moved the teat cups to an area below an udder of a cow via the space between the rear legs of the cow.

When the robotic manipulation device 10 has moved the gripping device 12 to the position shown in FIG. 2, the control unit 15 activates the gripping members 18 such that they are moved from the open position to the closed position which is shown in FIG. 3. During this motion, each gripping member 18 grips a respective teat cup 7. The gripping device 12 grips all four teat cups 7 before moving them to a second area $A_2$ located behind a rear portion of the cow 4. FIG. 4 shows the gripping device with the teat cups 7 in the second area $A_2$. The control unit 15 has here initiated a rotary motion of 180° of the gripping device 12 such that the teat cups 7 have been rotated to a position in which the openings 7a of the teat cups 7 are directed upwardly. The claw 8 of the cluster is now located below the teat cups 7. In this position, the cover element 16 of the gripping device 12 forms a protection above the gripping device 12 and the cluster. The movable cover portions 16a are in a covering position in which they cover the openings 7a of the teat cups 7. The control unit 15 initiates a movement of the gripping device 12 such that it moves the gripped teat cups 7 and the claw 8 along a path from the second area $A_2$ to a third area $A_3$ located below the udder of the cow 4 in the milking stall 3. FIG. 5 shows the teat cups 7 when they have arrived in the third area $A_3$. The teat cups 7 and the claw 8 are moved to the third area $A_3$ via a space between the rear legs of the cow 4.

Figure 6A:
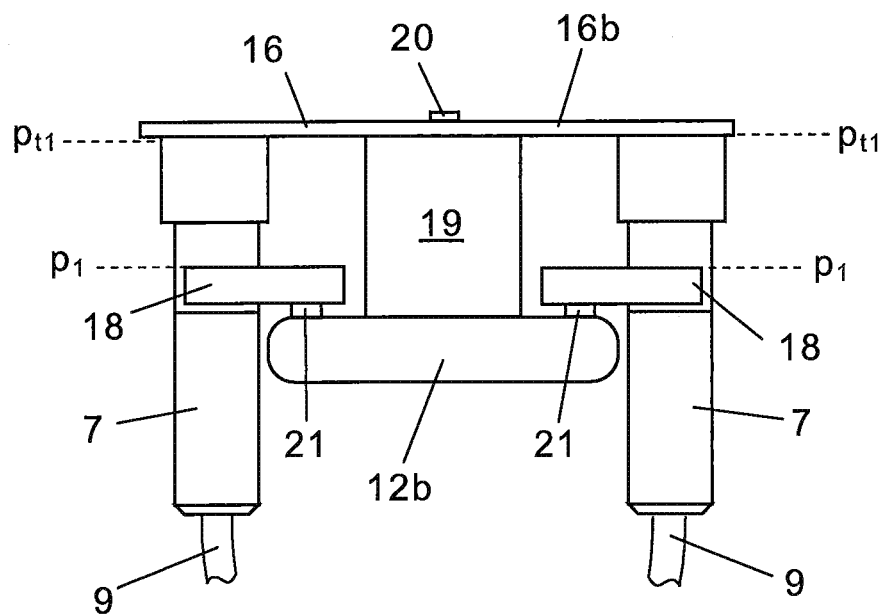
FIG. 6a shows a front view of the gripping device when the gripped teat cups are in a base position.
Figure 6B:
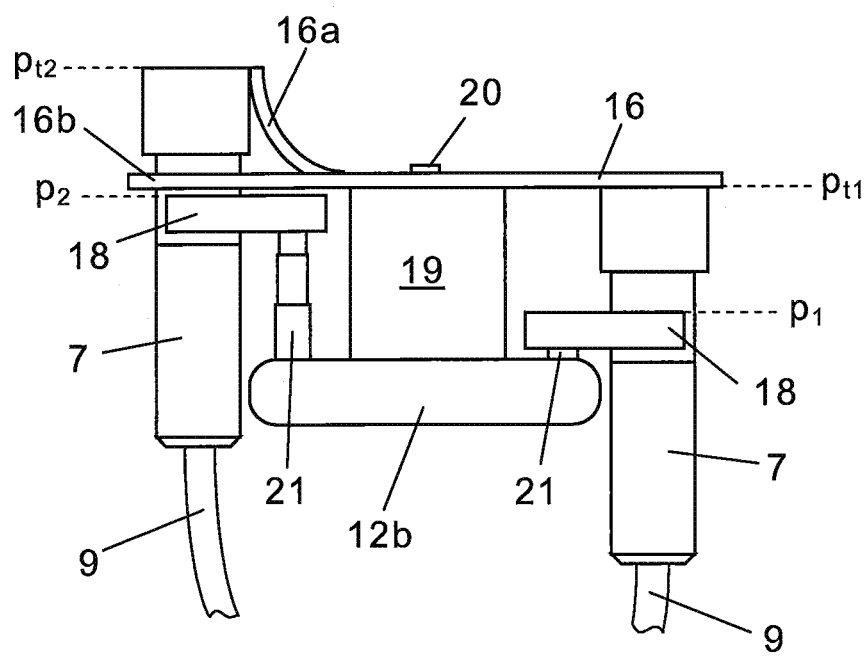
FIG. 6b shows a front view of the gripping device in FIG. 6a when one of the gripped teat cups has been lifted to a raised position.

FIGS. 6a-6b shows a front view of the gripping device 12 when it holds the teat cups 7 in an upwardly directed position. The gripping members hold the teat cups in this position during the movement of the gripping device 12 from the second area $A_2$ to the third area $A_3$. The two gripping members 18 and the gripped teat cups 7 at the outer end 12b of the gripping device 12 are here visible. Inevitably, the gripping members 18 have to grip the teat cups 7 at an area located at distance from an upper end of the teat cups 7. Therefore, the upper ends of the teat cups 7 are arranged at a higher level than the upper end of the gripping member 18 when the teat cups 7 are held in the upwardly directed position. Each gripping member 18 is movably arranged between a base transport position $p_1$ and a raised teat cup attachment position $p_2$ by means of a respective power member 21. The power member 21 is here exemplified as a telescopic device. The power member 21 may be pneumatically, hydraulically or electrically activated. The upper end portions of the gripped teat cups 7 are movably arranged in a corresponding manner between a base transport position $p_{t1}$ and a raised teat cup attachment position $p_{t2}$. When the gripping members 18 are in the base position $p_1$ they hold a respective upper end portion of a teat cup 7 at a level corresponding to the level of a lower surface of the cover element 16. Thereby, the lower surfaces of the movable cover portions 16a cover the openings 7a of the teat cups 7. When the gripping members 18 have been raised to the raised position $p_2$ they may hold a respective upper end portion of a teat cup 7 at a level corresponding to the level of a teat of the cow 4.

The gripping members 18 are kept in the base position $p_1$, and the upper end portion of the teat cups in a corresponding base position $p_{t1}$, except when a gripped teat cup is to be attached to a teat of a cow 4. Consequently, all gripping members 18 are in the base position $p_1$ when the gripping device 12 arrives to the third area $A_3$. In the third area $A_3$, the teat cups 7 are attached to the cow 4. The control unit 15 controls the robotic manipulation device 10 such that it positions a selected teat cup 7 in a position vertically below a teat of the cow 4 by means of information from the camera 14. The control unit 15 activates the power member 21 such that it moves the gripping member 18 from the base position $p_1$ to the raised position $p_2$. The teat cup 7 is in a corresponding way lifted towards the teat. The upper end portion of the teat cup 7, which is in contact with a lower surface of the movable cover portion 16a, provides a movement of the movable cover portion 16a from a covering position to a non-covering position. Since the movable cover portion 16a is made of a resilient material, it provides a deflecting movement from the covering position to a non-covering position in which the opening 7a to the teat cup 7 is exposed.

FIG. 6b shows a movable cover portion 16a which has been moved to the non-covering position. The gripping device 12 uses the movement of the teat cup 7 for moving the movable cover portion 16a from the covering position to the non-covering position. The movement from the covering position to the non-covering position of the movable cover portion 16a is performed during the movement of the gripping member 18 from the base position $p_1$ to the raised position $p_2$. The movable cover portion 16a reaches the non-covering position at the latest at the same time as the gripping member reaches the raised position $p_2$. When the gripping member has reached the raised position $p_2$ and the teat cup a corresponding position $p_{t2}$, the control unit 15 initiates a movement of the gripping member 18 to the open position such that the grip of the teat cup 7 is released. The teat cup 7 is now retained on the teat by means of vacuum pressure applied to the inner space of the teat cup 7. The movable cover portion 16a is dimensioned such that the free outer side of its rectangular body will not be located at a higher level than the upper surface of the teat cup 7 when it has reached the raised position $p_{t2}$. Thereby, the movable cover portion 16a will not influence the attaching process of the teat cup 7 in a negative manner.

The remaining gripped teat cups 7 are attached to the teats of the cow 4 in proper order in a corresponding manner. When all teat cups 7 have been attached to the teats of the cow 4, the control unit 15 activates the robotic manipulation device 10 such that it initiates a retracting movement of the gripping device 12 to a position outside the platform 1. The robotic manipulation device 10 is now ready to attach teat cups 7 to a cow 4 in a following milking stall 3 when it reaches the predetermined rotary position where the teat cups are to be attached. The retracting device performs a retracting motion of the cluster such that, it is removed back to the parking position in the storing device 6 as soon as the milking process is finished.

There is always a risk that manure and other pollutions will fall into the inner space of teat cups 7 when they are in an upwardly directed position, and especially when they are moved via the space between the rear legs of the cow 1. There is also a risk that manure penetrates into the inner space of teat cups 7 which are in an upwardly directed position while they are waiting to be attached to the teats of the cow 4 in the third area $A_3$ below the udder of a cow 4. According to the invention, each opening 7a to the inner space of the teat cups 7 is covered by a respective movable cover portion 16a of the cover element 16 from the time when the teat cups 7 are gripped in the first area $A_1$ until they are lifted for attachment to a teat of the cow 4 in the third area $A_3$.

Consequently, the risk that the inner space of the teat cups 7 will be contaminated by manure or other pollutions is substantially eliminated. Furthermore, the stationary cover portion 16b forms a protective roof above sensitive components of the gripping device 12, such as gripping members 18 and power members 21, when the teat cups 7 are held in the upwardly directed position.

Figure 7A:
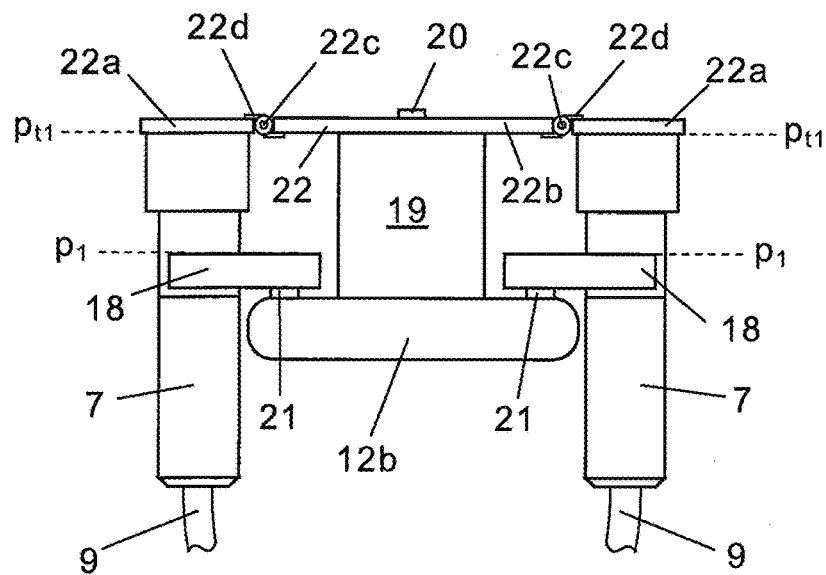
FIG. 7a shows a front view of the gripping device according to a second embodiment when the gripped teat cups are in a base position.
Figure 7B:
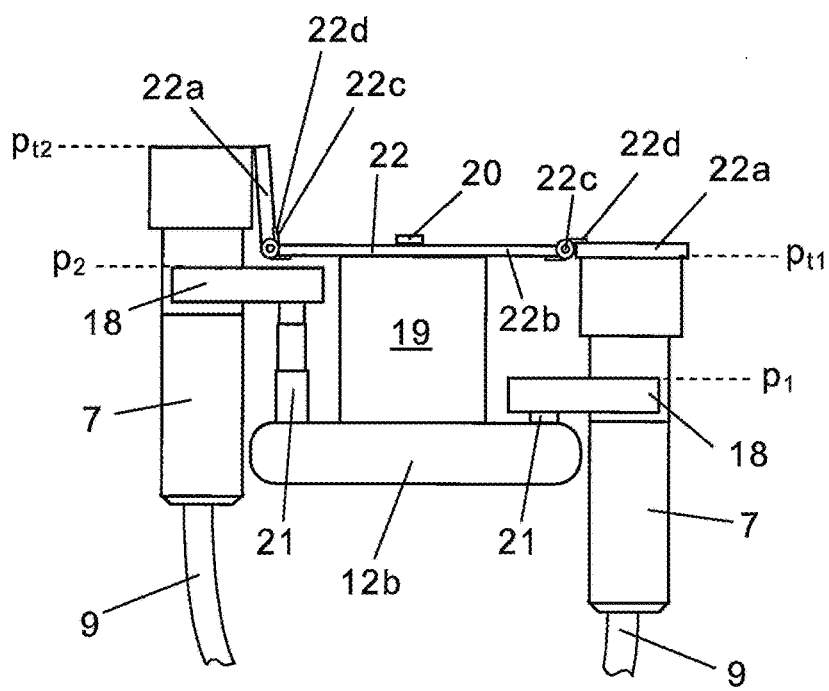
FIG. 7b shows a front view of the gripping device in FIG. 7a when one of the gripped teat cups has been lifted to a raised position.

FIGS. 7a-7b shows a front view of a gripping device 12 provided with an alternative embodiment of the cover element 22. Also in this case, the cover element 22 is plate-shaped and configured to cover the openings 7a of the teat cups 7 and sensitive components on the gripping device 12 such as gripping members 18 and power members 21. The cover element 22 comprises movably arranged cover portions 22a and a stationary cover portion 22b. Each movable cover portion 22a is connected to the stationary cover portion 22b by means of a pivot joint 22c. The pivot joint 22c includes a spring member 22d. The spring member 22d moves the movable cover portion 22a in a direction towards a covering position in which it covers the opening 7a to a teat cup 7. The stationary cover portion 22b is attached to an upper surface of a raised portion 19 by means of suitable fastening members 20.

A power member 21 moves the individual gripping member 18 between a base transport position $p_1$ and a raised teat cup attachment position $p_2$. The upper end portions of the gripped teat cups 7 is movably arranged in a corresponding manner between a base transport position $p_{t1}$ and a raised teat cup attachment position $p_{t2}$.

When the teat cups 7 are to be attached to the teats of a cow 4, the control unit 15 controls the robotic manipulation device 10 such that it positions a selected teat cup 7 in a position vertically below a teat of the cow 4 by means of information from the camera 14. The control unit 15 activates the power member 21 of the selected teat cup 18 such that it moves the gripping member 18, which holds the teat cup 7, from the base position $p_1$ to the raised position $p_2$. The gripped teat cup 7 is lifted towards the teat from the base position $p_{t1}$ to the raised position $p_{t2}$. The movement of the upper end portion of the teat cup 7, which is in contact with a lower surface of the movable cover portion 22a, is transmitted to a pivot movement of the movable cover portion 22a around the pivot joint 20c. The movable cover portion 22a is thereby moved from a covering position to an non-covering position in which the opening 7a of the teat cup 7 is exposed. The movable cover portion 22a reaches the non-covering position before or at the same time as the gripping member 18 reaches the raised position $p_2$. The teat is introduced into the inner space of the teat cup 7 when the gripping member has reached the raised position $p_2$. The teat cup 7 is attached to the teat by means of vacuum pressure which prevails in the inner space of the teat cup 7. The control unit 15 initiates a movement of the gripping member 18 such that the grip of the teat cup 7 is released. The movable cover portion 22a is dimensioned such that its uppermost portion in the non-covering position will not be located at a higher level than the upper end portion of the teat cup 7. Thereby, the pivotally arranged plate 16 will not come in contact with the teat and the udder of the cow 4 during the attachment process of the teat cup 7.

Figure 8A:
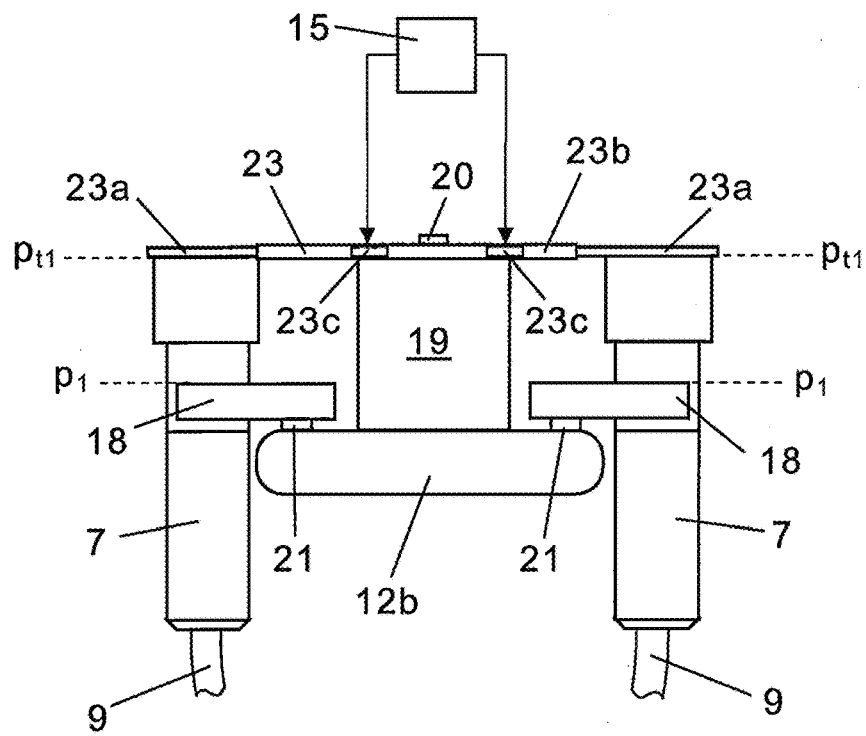
FIG. 8a shows a front view of the gripping device according to a third embodiment when the gripped teat cups are in a base position.
Figure 8B:
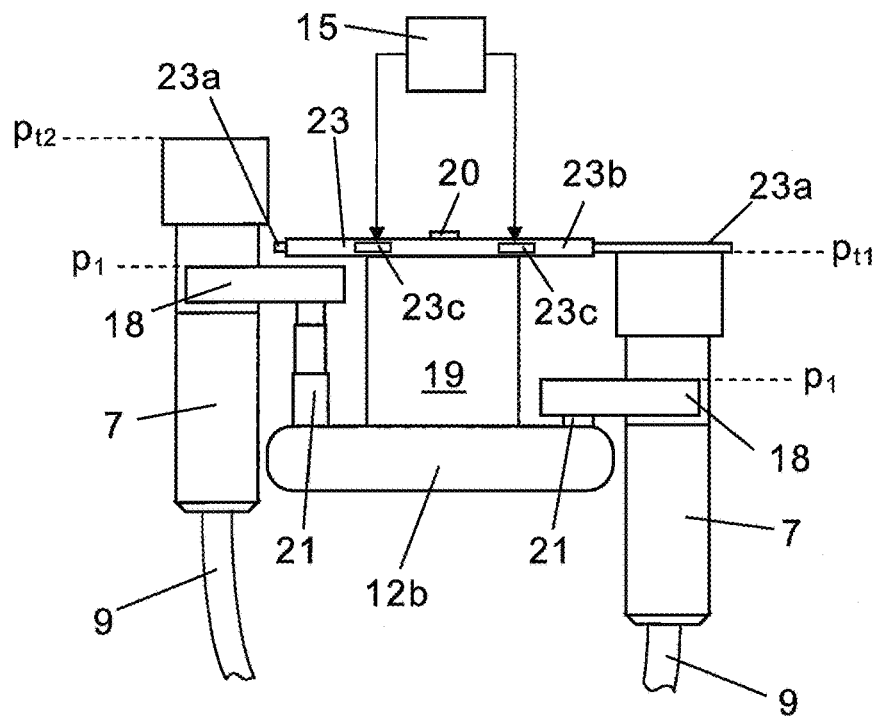
FIG. 8b shows a front view of the gripping device in FIG. 8a when one of the gripped teat cups has been lifted to a raised position.

FIGS. 8a-8b shows a front view of a gripping device 12 comprising a further alternative cover element 23. Also in this case, the cover element 23 is plate-shaped and configured to cover the openings 7a of the teat cups 7 and sensitive components on the gripping device 12 such as gripping members 18 and power members 21. The cover element 23 comprises movably arranged cover portions 23a and a stationary cover portion 23b. Each movable cover portion 23a is slidably arranged in relation to the stationary cover portion 23b between a covering position, in which it covers an opening 7a to a gripped teat cup 7, and a non-covering position, in which the opening 7a of the teat cup 7 is exposed. In this case, each movable cover portion 23a is slidably arranged into a recess of the stationary cover portion 23b. A schematically shown power element 23c provides the sliding movement of the respective movable cover portions 23a. The stationary cover portion 23b is attached to an upper surface of a raised portion 19 by suitable fastening members 20. The gripping device 12 comprises gripping members 18 which each is configured to releasably grip a teat cup 7, and power members 21 which each is configured to move a respective gripping member 18 between a base transport position $p_1$ and a raised teat attachment position $p_2$.

When it is time to attach the teat cups 7 to a teat of a cow 4, the control unit 15 controls the robotic manipulation device 10 such that it positions a selected teat cup 7 in a position vertically below a teat of the cow 4 by means of information from the camera 14. The control unit 15 activates the power element 23b such that it provides a sliding movement of the movable cover portion 23a from a covering position to a non-covering position, in which the opening 7a to the teat cup 7 is exposed. Thereafter, the control unit 15 activates the power member 21 such that the gripping member 18 which holds the teat cup 7 is moved from the base position $p_1$ to the raised position $p_2$. The teat cup 7 is in a corresponding way lifted towards the teat until the teat is introduced into the inner space of the teat cup 7. The vacuum pressure in the inner space of the teat cup 7 attaches the teat cup 7 to the teat. The control unit 15 initiates a movement of the gripping member 18 such that the grip of the teat cup 7 is released. The remaining teat cups 7 are attached to the teats of the cow 4 in proper order in a corresponding manner. In this embodiment of the cover element 23, the movable cover portion 23a provides a movement to the non-covering position by means of a power element 23a. Consequently, it is in this case possible to move the movable cover portion 23a to the non-covering position independently of the activation of the power member 21. The power element 23c may initiate the movement of the movable cover portion 23a to the non-covering position just before the power member 21 moves the gripping member from the base position to the raised position. Alternatively, the power element 23c may initiate the movement of the movable cover portion 23a to the non-covering position during the time period when the power member 21 moves the gripping member from the base position $p_1$ to the raised position $p_2$. In this case, it is necessary that the movable cover portion 23a reaches the non-covering position before or at the same time as the gripping member reaches the raised position $p_2$.

The invention is not limited to the described embodiments but may be varied and modified freely within the scope of the claims. It can be used together with any type of robot arm and gripper, and in any type of milking parlour, including stationary milking parlours.

The invention claimed is:

1. A gripping device (12) connectable to a robotic arm (10b) of a robotic manipulation device (10) that grips and attaches teat cups (7) to an animal (4), the gripping device (12) comprising:

a cover element (16, 22, 23);
plural gripping members (18), each gripping member having an open position that releases a corresponding teat cup and a closed position that grips the corresponding teat cup,
plural power members (21) operatively connected to a respective gripping member to move the gripping member between i) a base position (p1) relative to the cover element, to ii) a raised position (p2) relative to the cover element in which the teat cup (7) can be attached to a teat of the animal (4), the raised position being closer to the cover element than the first base position;
plural movable cover portions (16*a*, 22*a*, 23*a*) associated with the cover element, each movable cover portion movably arranged between i) a covering position that covers an opening (7*a*) of the corresponding teat cup teat cup (7) gripped by the gripping member, and ii) an non-covering position in which the opening (7*a*) of the corresponding teat cup teat cup (7) gripped by the gripping member is exposed; and
a control unit (15) operatively connected to the gripping members, the control unit i) moving the gripping members between the open and closed positions, and ii) controlling each power member (21) to individually lift each gripping member, and the corresponding teat cup (7), from the base position (p1) to the raised position relative (p2), wherein, during use, the movable cover portion (16*a*, 22*a*, 23*a*) is moved from the covering position to the non-covering position i) before the power member (21) lifts the gripping member, and the corresponding teat cup (7), from the base position (p1) to the raised position (p2), or ii) during the power member (21) lifting the gripping member, and the corresponding teat cup (7), from the base position (p1) to the raised position (p2).

2. The gripping device according to claim 1, wherein, during the lifting of each gripping member to the raised position (p2), the movable cover portion (16*a*, 22*a*, 23*a*) reaches the non-covering position before or at the same time as the holding member (18) reaches the raised position (p2).

3. The gripping device according to claim 1, wherein movement of the power member (21) in lifting the holding member (18) from the base position (p1) to the raised position (p2), is mechanically transmitted to a movement of the movable cover portion (16, 22) from the covering position to the non-covering position.

4. The gripping device according to claim 3, wherein the said movement of the power member (21) is mechanically transmitted by said teat cup (7) to the movement of the movable cover portion (16, 22) from the covering position to the non-covering position.

5. The gripping device according to claim 1, further comprising a power element (23*c*) operatively connected to each movable cover portion (16*a*, 22*a*, 23*a*), operation of the power element (23*c*) moving a corresponding one of the movable cover portions (16*a*, 22*a*, 23*a*) from the covering position to the non-covering position, wherein the control unit (15) initiates activation of the power element (23*c*) such that the power element (23*c*) operates to move the corresponding movable cover portion (16*a*, 22*a*, 23*a*) to the non-covering position in response to the action of said power member (21) lifting said holding member (18) from the base position (p1) to the raised position (p2).

6. The gripping device according to claim 1, wherein the cover element is has a plate shape and each movable cover portion is a pivotable plate connected to the cover element.

7. The gripping device according to claim 1, wherein each movable cover portion is a resilient movable part connected to the cover element.

8. The gripping device according to claim 1, wherein each movable cover portion is a part of the cover element.

9. The gripping device according to claim 8, wherein,
the cover element is a one piece cover element (16) made of a resilient material in one piece, and
each movable cover portion (16*a*) is a part of the one piece cover element (16).

10. The gripping device according to claim 8, wherein the movable cover portion (22*a*) is connected to the stationary cover portion (22*b*) by a pivot joint (22*c*).

11. The gripping device according to claim 10, wherein the said pivot joint (22*c*) includes a spring member (22*d*) configured to move the movable cover portion (22*a*) to the covering position.

12. The gripping device according to claim 1, wherein the gripping device further comprises a raised portion (19) that supports the cover element (16, 22, 23) such that at least the movable cover portions (16*a*, 22*a*, 23*a*) are each in the covering position when the corresponding teat cup (7) is gripped by the gripping member with the gripping member in the base position.

13. The gripping device according to claim 1, wherein the movable cover portions (22*a*) are slidably arranged between the covering position and the uncovering position.

14. The gripping device according to claim 1 in combination with the robotic arm,
wherein the robotic arm comprises a pivot element (17), the robotic arm (10*b*) being connected to the cover element such that the cover element is rotatable via the pivot element, and
wherein pivoting of the cover element positions each gripping member to grip the corresponding teat cup (7) wherein the teat cups are in a parking position.

15. A method of operating a gripping device, comprising the steps of:
with a robotic manipulation device (10), positioning the gripping device (12) gripping plural teat cups below a teat of an animal (4), the gripping device (12) comprising:
a cover element (16, 22, 23),
plural power members (21) operatively connected to a respective gripping member to move the gripping member (18) between i) a base position (p1) relative to the cover element to ii) a raised position (p2) relative to the cover element in which the teat cup (7) can be attached to a teat of the animal (4), the raised position being closer to the cover element than the base position,
plural movable cover portions (16*a*, 22*a*, 23*a*) associated with the cover element, each movable cover portion movably arranged between i) a covering position that covers an opening (7*a*) of the corresponding teat cup teat cup (7) gripped by the gripping member, and ii) an non-covering position in which the opening (7*a*) of the corresponding teat cup teat cup (7) gripped by the gripping member is exposed, and
a control unit (15) operatively connected to the gripping members, the control unit i) moving the gripping members between the open and closed positions and ii) controlling each power member (21) to individually lift each gripping member, and the corresponding teat cup (7), from the base position (p1) to the raised position relative (p2), the movable cover portion (16*a*, 22*a*, 23*a*) being movable from the covering position to the non-covering position where i) before the power member

(21) lifts the gripping member, and the corresponding teat cup (7), from the base position (p1) to the raised position (p2), or ii) during the power member (21) lifting the gripping member, and the corresponding teat cup (7), from the base position (p1) to the raised position (p2);

the control unit automatically lifting a first of the teat cups (7), by controlling the power member (21) to lift a first one of the gripping members (18) from the base position (p1) to the raised position (p2); and moving the movable cover portion (16a, 22a, 23a) from the covering position to the non-covering position, wherein the movable cover portion (16a, 22a, 23a) is moved i) before the power member (21) lifts the gripping member, and the corresponding teat cup (7), from the base position (p1) to the raised position (p2), or ii) during the power member (21) lifting the gripping member, and the corresponding teat cup (7), from the base position (p1) to the raised position (p2).

16. The method of claim 15, comprising the further steps of:

prior to said positioning step, the control unit moving the gripping device towards and below a cluster of the teat cups hanging in a parking position, with openings (7a) of the teat cups being directed downwardly;

the control unit activating the gripping members to move from the open position to the closed position to grip the teat cups; and the control unit initiating a rotary motion of the gripping device such that the teat cups (7) have been rotated to a position in which the openings (7a) of the gripped teat cups (7) are directed upwardly.

17. The method of claim 15, wherein during the lifting of each gripping member to the raised position (p2), the movable cover portion (16a, 22a, 23a) reaches the non-covering position before or at the same time as the holding member (18) reaches the raised position (p2).

18. The method of claim 15, wherein movement of the power member (21) in lifting the holding member (18) from the base position (p1) to the raised position (p2), is mechanically transmitted by said teat cup (7) contacting the corresponding to movable cover portion (16, 22) to cause a movement of the movable cover portion (16, 22) from the covering position to the non-covering position.

19. The method of claim 15, wherein, the movable cover portion (22a) is connected to the stationary cover portion (22b), and during the lifting of each gripping member to the raised position (p2), the corresponding movable cover portion (22a) is slidably displaced between the covering position and the uncovering position.

20. A gripping device (12) for a robotic manipulation device (10) that grips and attaches teat cups (7) to an animal (4), the gripping device (12) comprising:

a cover element (16, 22, 23);

plural gripping members (18) mounted on the cover element, each gripping member having an open position that releases a gripped teat cup and a closed position that grips the teat cup;

plural power members (21) operatively connected to a respective gripping member to move the gripping member between i) a base position (p1) to ii) a raised position (p2) in which the teat cup (7) can be attached to a teat of the animal (4);

plural movable cover portions (16a, 22a, 23a) associated with the cover element, each movable cover portion corresponding to one of the gripping members and movable between i) a covering position that covers an opening (7a) of the gripped teat cup teat cup (7), and ii) an non-covering position in which the opening (7a) is exposed; and a control unit (15) operatively connected to the gripping members for i) moving the gripping members between the open and closed positions and ii) controlling each power member (21) to individually lift each gripping member, and the gripped teat cup (7), from the base position (p1) to the raised position relative (p2), wherein, during use, the movable cover portion (16a, 22a, 23a) is moved from the covering position to the non-covering position i) before the power member (21) lifts the gripping member, and the corresponding teat cup (7), from the base position (p1) to the raised position (p2), or ii) during the power member (21) lifting the gripping member, and the corresponding teat cup (7), from the base position (p1) to the raised position (p2).

* * * * *